(12) United States Patent
Lee et al.

(10) Patent No.: US 11,644,198 B2
(45) Date of Patent: May 9, 2023

(54) TERMINAL, COOKING APPLIANCE COMMUNICATING THEREWITH AND METHOD OF CONTROLLING COOKING APPLIANCE

(71) Applicant: Samsung Electronics Co., Ltd, Suwon-si (KR)

(72) Inventors: Byung Sun Lee, Seongnam-si (KR); Young-Woon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 938 days.

(21) Appl. No.: 16/024,443

(22) Filed: Jun. 29, 2018

(65) Prior Publication Data

US 2018/0313544 A1 Nov. 1, 2018

Related U.S. Application Data

(63) Continuation of application No. PCT/KR2016/015273, filed on Dec. 26, 2016.

(30) Foreign Application Priority Data

Dec. 29, 2015 (KR) ........................ 10-2015-0188671

(51) Int. Cl.
*F24C 3/12* (2006.01)
*F24C 7/08* (2006.01)
(Continued)

(52) U.S. Cl.
CPC ............. *F24C 3/126* (2013.01); *F24C 7/082* (2013.01); *F24C 7/083* (2013.01); *F24C 7/085* (2013.01);
(Continued)

(58) Field of Classification Search
None
See application file for complete search history.

(56) References Cited

U.S. PATENT DOCUMENTS 5,746,114 A  5/1998 Harris
9,690,462 B2  6/2017 Kouda et al.
(Continued)

FOREIGN PATENT DOCUMENTS

CN  101589272 A  11/2009
CN  104136852 A  11/2014
(Continued)

OTHER PUBLICATIONS

Office Action dated Jul. 3, 2019 in connection with Chinese Patent Application No. 201680076817.4, 21 pages.
(Continued)

*Primary Examiner* — Ibrahime A Abraham
*Assistant Examiner* — Elizabeth M Kerr

(57) ABSTRACT

Disclosed herein is a cooking appliance including a communicator configured to perform communication with a terminal, an input unit configured to receive information from a user, and a controller configured to, when information on time until which remote control using the terminal is available is received via at least one of the communicator and the input unit, control the communication with the terminal. According to the present disclosure, by allowing a user to set a time at which a remote control mode is automatically cancelled after cooking is finished, the remote control is available during a time set by the user even after cooking is finished, and thus the usability of the remote control mode can be improved. According to the present disclosure, by limiting performance time of the remote control mode to be within a preset amount of time and limiting an infinite input of a remote control command into a terminal while the remote control mode is activated, a (Continued)

network error can be prevented, and erroneous operation of a cooking appliance due to hacking can be prevented.

9 Claims, 17 Drawing Sheets

(51) Int. Cl.
*H04M 1/72412* (2021.01)
*H04M 1/72415* (2021.01)
*H04Q 9/02* (2006.01)

(52) U.S. Cl.
CPC ... *H04M 1/72412* (2021.01); *H04M 1/72415* (2021.01); *H04Q 9/02* (2013.01); *H04Q 2209/40* (2013.01)

(56) References Cited

U.S. PATENT DOCUMENTS

| | | | |
|---|---|---|---|
| 2011/0146649 A1* | 6/2011 | Brenner | F24C 3/126 126/42 |
| 2014/0148147 A1 | 5/2014 | Tak et al. | |
| 2015/0019987 A1* | 1/2015 | Kouda | H04L 67/02 715/744 |
| 2016/0189538 A1* | 6/2016 | Endo | G08C 17/02 340/12.22 |
| 2017/0163438 A1* | 6/2017 | Gary, Jr. | H04L 67/563 |

FOREIGN PATENT DOCUMENTS

| | | | |
|---|---|---|---|
| EP | 1596600 A1 * | 11/2005 | ......... H04N 21/4623 |
| EP | 1596600 A1 | 11/2005 | |
| EP | 3176983 A2 | 6/2017 | |
| KR | 10-2005-0109211 A | 11/2005 | |
| KR | 10-0701180 B1 | 3/2007 | |
| KR | 10-2013-0023599 A | 3/2013 | |
| KR | 10-2014-0039733 A | 4/2014 | |
| KR | 10-2015-0083542 A | 7/2015 | |
| WO | 2010079470 A1 | 7/2010 | |

OTHER PUBLICATIONS

International Search Report dated Apr. 11, 2017 in connection with International Patent Application No. PCT/KR2016/015273.
Written Opinion of the International Searching Authority dated Apr. 11, 2017 in connection with International Patent Application No. PCT/KR2016/015273.
The Second Office Action in connection with Chinese Application No. 201680076817.4 dated Mar. 25, 2020,18 pages.
Communication pursuant to Article 94(3) EPC in connection with European Application No. 16882051.2 dated Feb. 7, 2020, 5 pages.
European Patent Office, "Invitation pursuant to Rule 63(1) EPC," Application No. EP16882051.2, Nov. 6, 2018, 4 pages.
Extended European Search Report, dated Feb. 26, 2019, regarding Application No. 16882051.2, 10 pages.
The Third Office Action dated Sep. 30, 2020 in connection with Chinese Application No. 201680076817.4, 20 pages.
Notice of Preliminary Rejection dated Nov. 25, 2021, in connection with Korean Application No. 10-2015-0188671, 13 pages.
Notice of Final Rejection dated May 26, 2022, in connection with Korean Application No. 10-2015-0188671, 7 pages.

* cited by examiner

TERMINAL, COOKING APPLIANCE COMMUNICATING THEREWITH AND METHOD OF CONTROLLING COOKING APPLIANCE

CROSS-REFERENCE TO RELATED APPLICATIONS AND CLAIM OF PRIORITY

This application is a continuation of International Application No. PCT/KR2016/015273 filed Dec. 26, 2016, which claims priority to Korean Patent Application No. 10-2015-0188671 filed Dec. 29, 2015, the disclosures of which are herein incorporated by reference in their entirety.

TECHNICAL FIELD

The present disclosure relates to a terminal for safe remote control, a cooking appliance communicating therewith and a method of controlling the cooking appliance.

BACKGROUND

1. Field

Generally, cooking appliances are appliances for heating and cooking food, and are mainly classified into a type in which heat for heating food is generated using electricity and a type in which heat for heating food is generated by combusting gas.

2. Description of Related Art

Such cooking appliances may be classified into a gas stove, an oven, an electric stove, and the like.

While cooking food using such cooking appliances, maintenance of specific temperature and time control are important factors in determining taste of food.

That is, in a case where temperature of heat for cooking food is too low or high, food may be undercooked or burned.

Recently, techniques for remotely controlling a cooking appliance to improve food cooking performance has been developed.

Such remote control of a cooking appliance is started by manipulation of a button provided in the cooking appliance, and is maintained even after cooking is finished.

In this case, there is a problem in that the cooking appliance is erroneously operated due to a network error, the cooking appliance is hacked by an outside intruder, or the cooking appliance is erroneously manipulated by an unwanted user.

Further, in a case where remote control is performed by manipulation of a button provided in a cooking appliance and is automatically cancelled when cooking is finished, there is a problem in that it is difficult to re-operate the cooking appliance by a user who is remotely located from the cooking appliance.

SUMMARY

It is an aspect of the present disclosure to provide a terminal in which a remote control mode capable time is set by a user, a cooking appliance communicating with the terminal and a method of controlling the cooking appliance.

It is another aspect of the present disclosure to provide a cooking appliance in which a remote control mode performance time is limited to a preset maximum time limit and a method of controlling the cooking appliance.

It is still another aspect of the present disclosure to provide a cooking appliance capable of receiving a control command from a terminal set as a master and transmitting monitoring information to a terminal set as a slave and the terminal set as the master and a method of controlling the cooking appliance.

According to an aspect, a cooking appliance includes a communicator configured to perform communication with a terminal, an input unit configured to receive information from a user, and a controller configured to, when information on time until which remote control using the terminal is available is received via at least one of the communicator and the input unit, control the communication with the terminal.

According to an aspect, the information on remote control available time of the cooking appliance may include information on additional time during which remote control is available from a time point at which cooking of food is finished.

According to an aspect, the controller of the cooking appliance may include, when information on time extension is received within the time until which remote control with the terminal is available, changing the remote control available time on the basis of the received time extension information.

According to an aspect, the information on remote control available time of the cooking appliance may include at least one piece of information from among a date, time, minutes, and seconds set by the user.

According to an aspect, the controller of the cooking appliance may include, when total performance time of a remote control mode using the terminal exceeds a preset maximum time limit, blocking communication with the terminal.

According to an aspect, the cooking appliance may further include at least one heating plate, and the controller may further include controlling transmission of operational state information of the at least one heating plate to the terminal.

According to an aspect, the cooking appliance may further include a cooking compartment in which food is stored, and a monitorer configured to monitor cooking state of the food in the cooking compartment, and the controller may include transmitting monitored information to the terminal on the basis of the remote control available time information.

According to an aspect, the cooking appliance may further include a door configured to open and close the cooking compartment, and a detector configured to detect an open or closed state of the door, and the controller may further include, when the door is in the open state within the time until which remote control with the terminal is available, blocking communication with the terminal.

According to an aspect, the controller of the cooking appliance may include, when a control command is received from the terminal within the time until which remote control with the terminal is available, controlling cooking of the food on the basis of the received control command.

According to an aspect, the controller of the cooking appliance may include, when the terminal is a terminal set as a master, receiving a control command therefrom and controlling operation of at least one of a plurality of loads and controlling transmission of monitored information, and when the terminal is a terminal set as a slave, controlling transmission of monitoring information.

According to another aspect, a cooking appliance includes a communicator configured to perform communication with a terminal, an input unit configured to receive a remote control mode, and a controller configured to count performance time of the remote control mode when the remote control mode is input and block the communication with the terminal when the counted performance time exceeds a maximum time limit.

According to another aspect, the cooking appliance may further include a door configured to open and close a cooking compartment, and a detector configured to detect an open or closed state of the door, and the controller may include, when the door is in the open state or a remote control mode cancel command is input to the input unit, initializing the counted performance time of the remote control mode.

According to still another aspect, a method of controlling a cooking appliance includes, when a remote control mode is input, outputting information that requests input of remote control available time, when information on the remote control available time is received via at least one of a communicator and an input unit, controlling communication with a terminal on the basis of the received information on the remote control available time, and transmitting cooking information of food to the terminal during the remote control available time.

According to still another aspect, in the method of controlling the cooking appliance, the information on the remote control available time may include information on additional time until which remote control is available from a time point at which cooking of food is finished.

According to still another aspect, the method of controlling the cooking appliance may further include, when information on time extension is received within the time until which remote control with the terminal is available, changing the remote control available time on the basis of the received time extension information.

According to still another aspect, the method of controlling the cooking appliance may further include counting performance time of the remote control mode using the terminal and blocking the communication with the terminal when the counted performance time exceeds a preset maximum time limit.

According to still another aspect, the method of controlling the cooking appliance may further include checking operational states of a plurality of heating plates, and transmitting information on the checked operational states of the plurality of heating plates to the terminal.

According to still another aspect, the method of controlling the cooking appliance may further include detecting an open or closed state of a door configured to open and close a cooking compartment, and blocking the communication with the terminal when the door is open within the time until which remote control with the terminal is available.

According to still another aspect, the method of controlling the cooking appliance may further include, when a control command is received from the terminal within the time until which remote control with the terminal is available, controlling cooking of the food on the basis of the received control command.

According to still another aspect, the method of controlling the cooking appliance may further include, when the terminal is a terminal set as a master, receiving a control command therefrom and controlling operation of at least one of a plurality of loads and controlling transmission of monitored information, and when the terminal is a terminal set as a slave, controlling transmission of monitoring information.

According to yet another aspect, a terminal includes an input unit, a communicator configured to communicate with a cooking appliance, a display configured to display information on the cooking appliance, and a controller configured to, when remote control available time is input into the input unit, control information on the input remote control available time to be transmitted to the cooking appliance, and when a control command is input into the input unit within the remote control available time, control the input control command to be transmitted to the cooking appliance.

The controller of the terminal may, when set as a master, activate inputting of the control command and outputting of information on the cooking appliance, and when set as a slave, activate only the outputting of information on the cooking appliance.

The controller of the terminal may include, when the remote control available time has elapsed, controlling an output of information that blocks communication with the cooking appliance.

The controller of the terminal may include, when time extension information is input to the input unit within the remote control available time, controlling the input time extension information to be transmitted to the cooking appliance.

According to the present disclosure, by allowing a user to set a time at which a remote control mode is automatically cancelled after cooking is finished, the remote control is available during a time set by the user even after cooking is finished, and thus the usability of the remote control mode can be improved.

According to the present disclosure, by limiting performance time of the remote control mode to be within a preset amount of time and limiting an infinite input of a remote control command into a terminal while the remote control mode is activated, a network error can be prevented, and erroneous operation of a cooking appliance due to hacking can be prevented.

According to the present disclosure, when communication occurs between a cooking appliance and a plurality of terminals, by performing remote control of the cooking appliance using only a terminal set as a master and allowing a terminal set as a slave to only be capable of monitoring, cooking of food by the cooking appliance can be prevented from being interrupted by a user with no control authority from among registered users.

According to the present disclosure, by displaying on or off states of a plurality of cooktops provided in a cooking appliance through a remote terminal, it is possible for a user to easily check states of the cooktops from a remote place, and thus safety can be improved.

DETAILED DESCRIPTION

Hereinafter, the present disclosure will be described in detail with reference to the accompanying drawings.

Figure 1:
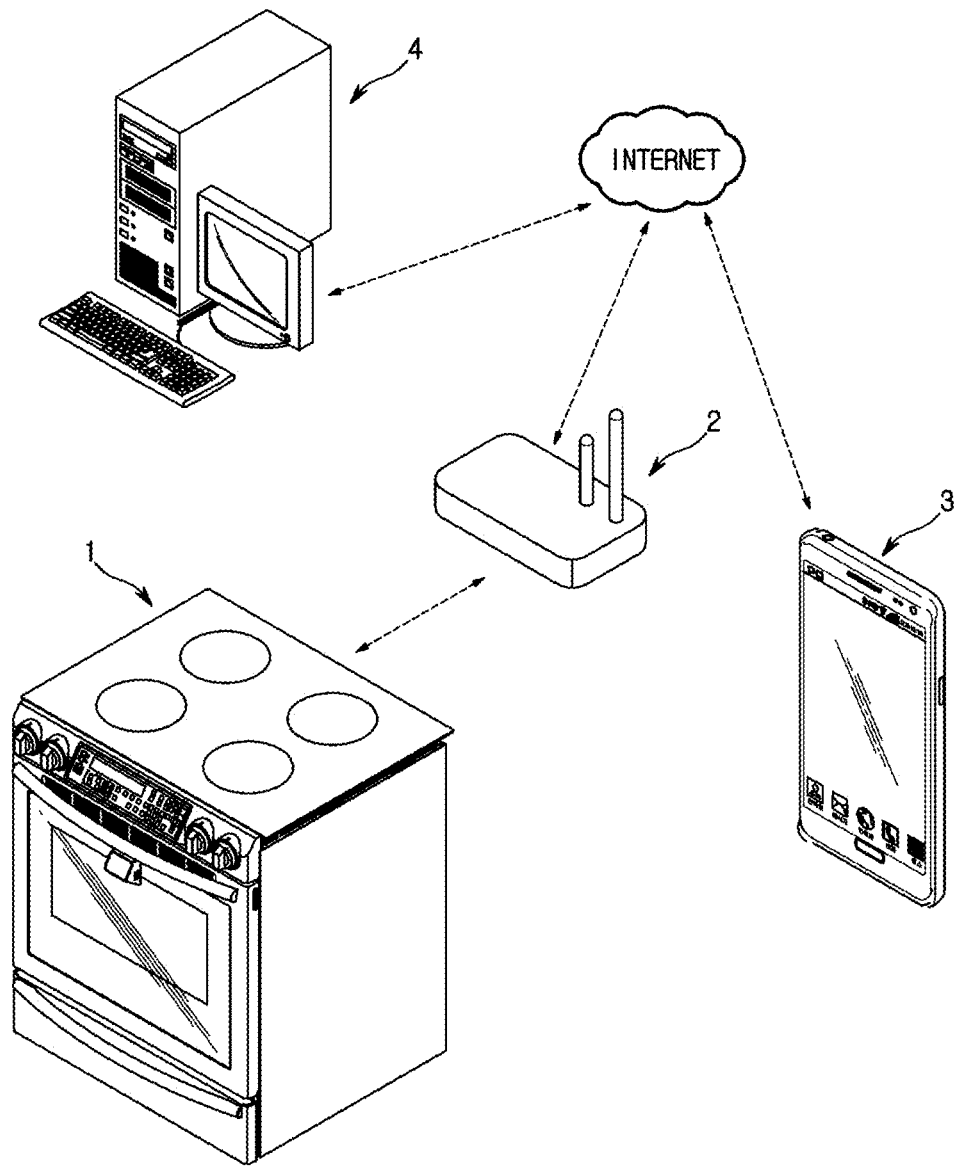
FIG. 1 is an exemplary diagram of a home network system including a cooking appliance according to an embodiment.

FIG. 1 is an exemplary diagram of a home network system including a cooking appliance according to an embodiment.

The home network system includes a cooking appliance 1 from among home appliances, an access point (AP) 2, a terminal 3, and a server 4.

The home appliances refer to appliances used in home and whose operations may be controlled by the terminal 3 at a remote place, and may include a refrigerator, an air conditioner, a washing machine, a dryer, a television, an audio, a vacuum cleaner, a lighting, and a cooking appliance.

In the present embodiment, only the cooking appliance will be described as an example.

The cooking appliance 1 is a home appliance for heating and cooking food.

The cooking appliance 1 receives a control command input into the terminal 3 and performs operation for cooking on the basis of the received control command, or performs operation for cooking on the basis of a control command input into a manipulation unit or a first input unit of a first user interface.

That is, the cooking appliance 1 may receive a control command by a remote control mode using the terminal and a general control mode using the first user interface and perform operation for cooking.

The AP 2 is a device capable of using the Internet, and is a network device that is connected to an Internet line in the home and transmits a wireless signal to allow a plurality of home appliances to share the single Internet line and access the Internet simultaneously.

The AP 2 has an Internet protocol (IP) address assigned from an Internet service provider, and serves to allow the plurality of home appliances to share the single IP address and connect to the Internet.

The AP 2 stores unique IP addresses of the home appliances to connect the home appliances to the Internet.

That is, when the home appliances are connected to the AP, unique IP addresses (virtual IP addresses or private IP addresses) are automatically assigned to the home appliances so that the home appliances may connect to the Internet simultaneously.

The AP 2 performs communication with the cooking appliance 1 and the server 4.

That is, the AP 2 allows information on the cooking appliance 1 to be transmitted to the server 4, and allows information on the server 4 to be transmitted to the cooking appliance 1.

The terminal 3 is connected to the Internet via a communication network of a communication service provider to which the terminal 3 is joined and performs communication with the server 4.

The terminal 3 includes an application for remotely controlling the cooking appliance 1 and monitoring an operational state of the cooking appliance.

Such a terminal 3 may transmit and receive information on the cooking appliance via the server 4.

The server 4 is a device configured to store, combine, and distribute various pieces of information on the home appliances in the home, and stores and re-distributes control commands for the home appliances received via the Internet.

The server 4 may store user information, information on the cooking appliance 1 for each user, and information on at least one terminal 3 approved by a user to remotely control the cooking appliance 1.

The server 4 may be connected to the AP 2 in the home via the Internet.

When a control command is received from a terminal, the server 4 checks identification information of the terminal that has transmitted the control command, checks a cooking appliance corresponding to the checked identification information of the terminal, and transmits the control command from the terminal to the checked cooking appliance.

When cooking information and monitoring information are received from a cooking appliance, the server 4 checks information on the cooking appliance that has transmitted the cooking information and the monitoring information, checks a terminal corresponding to the checked information on the cooking appliance, and transmits the cooking information and the monitoring information to the checked terminal.

That is, the server 4 transmits a control command input from the terminal 3 to the cooking appliance 1 via the AP 2, and transmits cooking information and monitoring information on the cooking appliance 1 input via the AP 2 to the terminal 3.

The server 4 may also cut off connection between the cooking appliance 1 and the terminal 3 when remote control available time has elapsed.

The configuration of the cooking appliance provided in such a home network system will be described in detail with reference to FIGS. 2 to 4.

Figure 2:
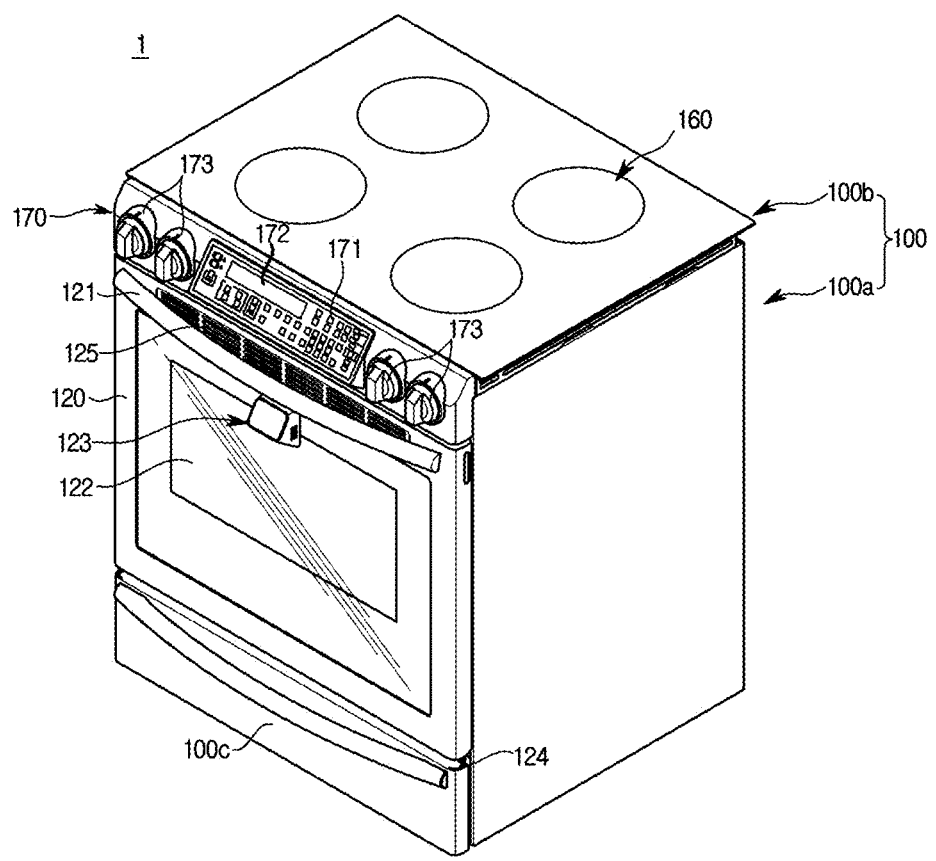
FIG. 2 is an exemplary diagram of a cooking appliance according to an embodiment.
Figure 3:
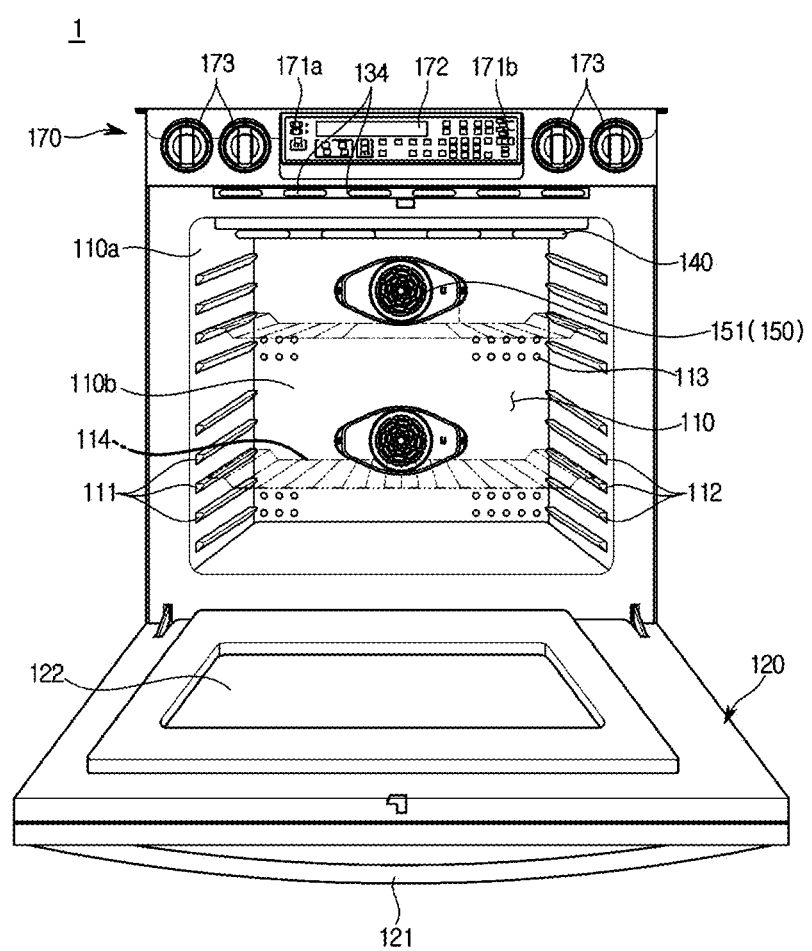
FIG. 3 is an exemplary diagram of a cooking compartment of the cooking appliance illustrated in FIG. 2.
Figure 4:
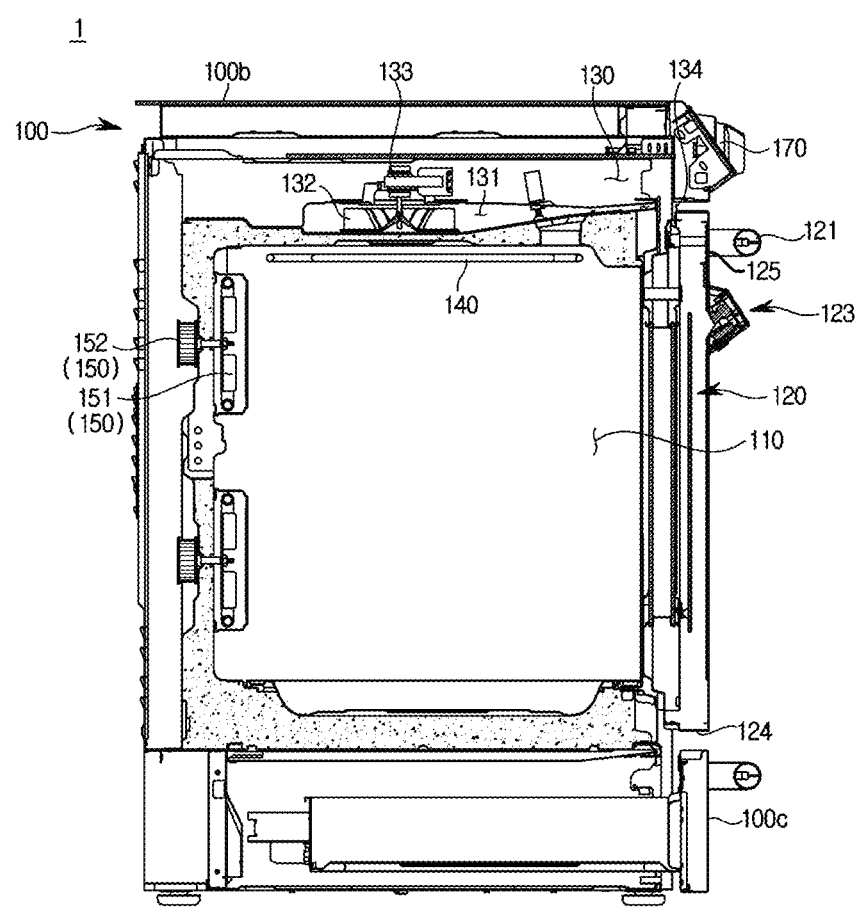
FIG. 4 is a side view of the cooking appliance illustrated in FIG. 2.

FIG. 2 is an exemplary diagram of a cooking appliance according to an embodiment, FIG. 3 is an exemplary diagram of a cooking compartment of the cooking appliance illustrated in FIG. 2, and FIG. 4 is a side view of the cooking appliance illustrated in FIG. 2.

As illustrated in FIG. 2, a cooking appliance 1 includes a main body 100 forming an exterior.

The main body 100 includes a first cooking portion 100a and a second cooking portion 100b disposed above the first cooking portion 100a. Such a first cooking portion 100a may be an oven, and the second cooking portion 100b may be a stove.

The main body 100 may further include a storage compartment 100c provided at a lower portion of the first cooking portion 100a, provided in the form of a drawer, and inserted and withdrawn by sliding.

Further, the main body 100 of the cooking appliance 1 may also include only the first cooking portion 100a from among the first cooking portion 100a, the second cooking portion 100b, and the storage compartment 100c.

The first cooking portion 100a includes a cooking compartment 110 (see FIGS. 3 and 4) forming a cooking space, and a door 120 configured to open and close the cooking compartment 110.

Such a first cooking portion 100a generates heat when food is accommodated in the cooking compartment 110 and then the cooking compartment 110 is sealed by the door 120, and transmits the generated heat to the cooking compartment 110 for the sealed food to be cooked by dry heat.

More specifically, as illustrated in FIG. 3, the cooking compartment 110 may be formed in the shape of a box, and may include an opening formed at a front surface for food to be taken in and out, a side panel 110a formed of an upper side surface, a lower side surface, a left side surface, and a right side surface, and a rear panel 110b disposed at an edge of the side panel 110a.

The cooking compartment 110 further includes a pair of supports 111 and 112 respectively fixed to the left side surface and the right side surface of the side panel 110a and protruding from the side panel 110a.

A plurality of pairs of supports 111 and 112 may be disposed vertically in the cooking compartment 110.

A plurality of holes 113 through which air moves may be formed in the rear panel 110b of the cooking compartment 110. The plurality of holes 113 may also be formed in the side panel 110a of the cooking compartment 110.

A tray 114 on which food may be placed may be detachably mounted on the pair of supports 111 and 112.

Here, the tray 114 may be formed of an insulating material such that the cooking compartment is separated into two cooking spaces and the two cooking spaces are insulated from each other by the tray 114, or the tray 114 may also be used for the purpose of placing food thereon.

That is, the cooking compartment 110 may be divided into a plurality of cooking spaces by the tray 114 mounted on the pair of supports.

The door 120 of the first cooking portion 100a may be hinge-coupled to the main body 100 to be rotatable with respect to the main body 100.

As illustrated in FIG. 2, the first cooking portion 100a includes a handle 121 provided at the door 120 and gripped by a user, a see-through window 122 configured to allow the inside of the cooking compartment 110 to be visually checked from the outside while the door 120 is closed, and a monitorer 123 provided at the see-through window 122 and configured to monitor a cooking state inside the cooking compartment 110 through the see-through window 122.

The handle 121 may protrude toward the front of the door.

Further, the handle 121 may also be recessed inward from an outer surface of the door 120 for a user to easily grip the handle 121.

The see-through window 122 may be provided with a transparent material.

Although the monitorer 123 has been described as being provided at the see-through window 122 of the door 120 outside the cooking compartment 110 as an example, the monitorer 123 may also be provided inside the cooking compartment 110.

As illustrated in FIGS. 2 and 4, the door 120 may include a door suction hole 124 disposed at a lower end outside the door 120 to suction air toward the inside of the door 120, and a door discharge hole 125 disposed at an upper end outside the door 120 to discharge air introduced via the door suction hole 124 to the outside.

Further, high-temperature air generated in the cooking compartment 110 may be cooled by circulation of the air introduced via the door suction hole 124.

The air introduced via the door suction hole 124 may be heat-exchanged with the high-temperature air in the cooking compartment 110 inside the door 120.

As illustrated in FIG. 4, the main body 100 of the cooking appliance 1 further includes an electric component room 130 disposed adjacent to the cooking compartment 110, having a space independent from the cooking compartment 110, and in which various electric components (not illustrated) such as a circuit board are provided.

In such an electric component room 130, an air exhaust duct 131, a cooling fan 132 configured to suction air of the cooking compartment 110 and allow the suctioned air of the cooking compartment 110 and air of the electric component room 130 to be exhausted to the front of the main body 100, and a cooling motor 133 configured to drive the cooling fan 132 may be disposed.

The air exhaust duct 131 of the electric component room 130 connects the cooking compartment 110 and a discharge hole 134 and allows air of the cooking compartment 110 suctioned into the electric component room 130 to be discharged to the outside via the discharge hole 134 formed at a front portion of the main body 100.

The first cooking portion 100a further includes a heating unit 140 disposed adjacent to an upper surface of the cooking compartment 110 and configured to generate heat and provide the heat to the inside of the cooking compartment 110, and a circulator 150 configured to allow air inside the cooking compartment 110 to be circulated.

Here, the heating unit 140 may be a heater.

The heating unit 140 may include a plurality of heaters.

In the heating unit 140 of the first cooking portion, a first heater may be disposed in a quadrilateral shape along an edge of the upper surface of the cooking compartment, and a second heater may be disposed inside the quadrilateral shape formed by the first heater.

Such The heating unit 140 may heat sides inside the cooking compartment using the first heater and heat a central portion inside the cooking compartment using the second heater.

The capacities of the plurality of heaters may be the same or different from each other.

The first cooking portion 100a may further include a magnetron (not illustrated) configured to generate electromagnetic waves for heat to be generated by rotation of water molecules inside food, and a steam portion (not illustrated) configured to generate steam.

The circulator 150 allows air inside the cooking compartment to be circulated while food is being cooked.

Such a circulator 150 includes a circulating fan 151 disposed at a rear surface of the cooking compartment 110 and configured to cause convection of air inside the cooking compartment 110, and a circulating motor 152 configured to drive the circulating fan 151.

A plurality of circulating fans 151 may be provided, and the plurality of circulating fans 151 may be vertically disposed in the cooking compartment.

The circulator 150 may selectively rotate at least one circulating fan from among the plurality of circulating fans in accordance with a location at which food is placed.

The plurality of circulating fans may be centrifugal fans or turbo fans configured to suction air from an upper side and discharge air in a radial direction.

The cooking appliance may also control a flow speed of air circulating inside the cooking compartment by controlling a rotational force of the circulating motor 152.

The second cooking portion 100b includes at least one heating plate 160 provided to be exposed to the outside of the main body 100 and on which a cooking container may be placed.

Such a second cooking portion 100b transmits generated heat toward a cooking container placed on the heating plate 160 and allows food in the cooking container to be cooked.

Here, the heating plate 160 may be a heater configured to generate heat using electricity or gas.

The main body 100 of the cooking appliance includes a first user interface 170 through which cooking information of the first cooking portion 100a and the second cooking portion 100b is input and output.

The first user interface 170 includes a first input unit 171 configured to receive cooking information of the first cooking portion 100a, and a first display 172 configured to output the cooking information of the first cooking portion 100a.

Here, the cooking information may include information on a cooking mode, cooking temperature, cooking start time, time elapsed, remaining time, cooking end time, and the like.

The cooking information may include a control mode such as a remote control mode or a general control mode, and may further include information on time in which remote control using the terminal 3 is available.

The first input unit 171 of the first user interface may include a first button 171a configured to receive a cooking start command and a cooking stop command, and a second button 171b configured to receive commands to start and end the remote control mode.

The first button 171a and the second button 171b may be provided as physical buttons or touch buttons, and receive on and off commands in accordance with the number of times of inputs.

The first input unit 171 of the first user interface may further include a button configured to receive a cooking pause command.

The first input unit 171 of the first user interface may further include a button configured to receive remote control available time, and a button configured to receive identification information of the terminal 3 capable of the remote control.

The first input unit 171 of the first user interface 170 may be provided as a physical button or a touch panel type, and the first display 172 may be provided as a display panel separately installed from the first input unit 171.

The first input unit 171 and the first display 172 of the first user interface 170 may be provided as a touchscreen.

That is, the first input unit 171 may be provided as a touch panel, and the first display 172 may be provided as a flat plate display panel such as a liquid crystal display (LCD), a plasma display panel (PDP), and an organic light emitting diode (OLED) provided adjacent to the touch panel and configured to display a plurality of buttons and cooking information.

The first user interface 170 may further include a manipulation unit 173 provided corresponding to the at least one heating plate 160 and configured to receive heating level information and an on or off operation command of the at least one heating plate 160.

The manipulation unit 173 may be provided as a physical button, a touchpad, or a dial type.

The number of manipulation units 173 may be the same as the number of heating plates.

Further, the display 172 of the first user interface may also display a heating level and an on or off operational state during operation of the second cooking portion 100b.

Figure 5:
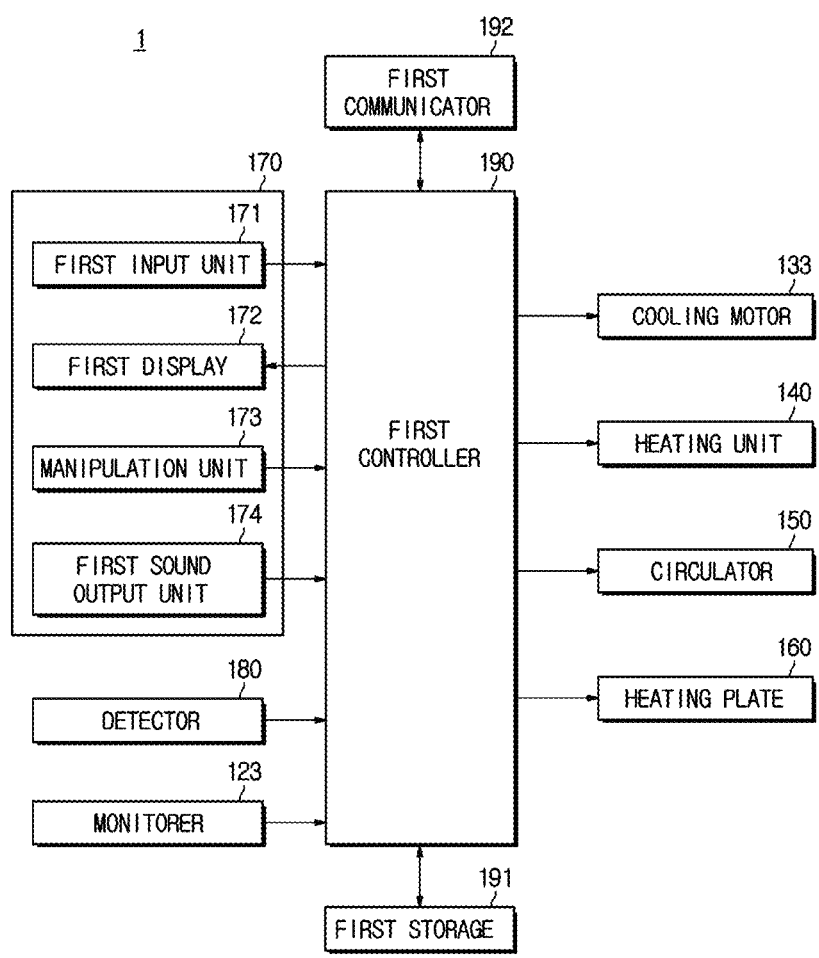
FIG. 5 is a control configuration diagram of a cooking appliance according to an embodiment.

FIG. 5 is a control configuration diagram of a cooking appliance according to an embodiment.

A cooking appliance 1 includes a monitorer 123, a first user interface 170, a detector 180, a first controller 190, a first storage 191, a first communicator 192, and a plurality of loads 133, 140, 150, and 160.

To distinguish control configurations of the cooking appliance and control configurations of the terminal from each other, "first" will be attached to the control configurations of the cooking appliance, and "second" will be attached to the control configurations of the terminal.

The monitorer 123 monitors a cooking state of food inside a cooking compartment 110 of a first cooking portion 100a and transmits monitoring information to the first controller 190.

Such a monitorer 123 may include an image sensor configured to collect images of food inside the cooking compartment.

Further, the monitorer 123 may also further include a separate communication module and use the communication module to transmit monitoring information to the first controller 190.

The communication module may transmit and receive a wireless signal using a mobile communication method such as $3^{rd}$ generation (3G) and $4^{th}$ generation (4G), and in addition, may transmit monitoring information and receive a control command for monitoring using various short-range communication methods such as wireless local area network (LAN), wireless fidelity (Wi-Fi), Bluetooth, ZigBee, Wi-Fi Direct (WFD), ultra-wideband (UWB), infrared data association (IrDA), Bluetooth low energy (BLE), and near field communication (NFC).

The first user interface 170 receives cooking information from a user and outputs cooking information related to cooking of food, and includes a first input unit 171 configured to receive cooking information of the first cooking portion 100a and a first display 172 configured to display the cooking information with an image.

Here, cooking information may include information on a type of food, cooking mode, cooking temperature, cooking performance time, cooking start time, time elapsed, remaining time, cooking end time, and the like.

The first input unit 171 may receive a control mode such as a remote control mode or a general control mode, and may further receive information on time in which remote control using the terminal 3 is available.

The first input unit 171 of the first user interface may further receive a cooking start command, a cooking stop command, and a cooking pause command, and may receive identification information of the terminal 3 capable of the remote control.

The first input unit 171 of the first user interface may further receive information on a maximum time limit until which the remote control is available.

Here, the information on the maximum time limit may be preset information, and stored in the first storage 191.

The first user interface 170 may further include a manipulation unit 173 configured to receive a heating level of the second cooking portion 100b, and a first sound output unit 174 configured to output cooking information of the first cooking portion and the second cooking portion with sound.

The first sound output unit 174 may output cooking start information, cooking finish information, information on an end of remote control available time, information on an extension of the remote control available time, and the like with sound.

The detector 180 detects cooking information and main body state information, includes a cooking compartment temperature detector configured to detect temperature of the cooking compartment and a door open or close detector configured to detect an open or closed state of the door, and may further include a food temperature detector configured to detect temperature of food.

The door open or close detector may include a contact sensor or a non-contact sensor.

In a case where the door open or close detector is a contact sensor, the door open or close detector may be a push type (for example, a limit switch, a micro-switch, or the like).

In a case where contact between the door open or close detector and the door 120 is released, the door 120 may be open, and in a case where the door open or close detector comes into contact with the door 120, the door 120 may be closed.

In a case where the door open or close detector is a non-contact sensor, the door open or close detector may be an optical sensor, a proximity sensor, or the like.

In a case where a gap is generated between the door open or close detector and the door 120, the door 120 may be in the open state, and in a case where there is no gap between the door open or close detector and the door 120, the door 120 may be in the closed state.

The cooking compartment temperature detector and the food temperature detector may include one of a resistance temperature detector thermometer, a thermistor thermometer, a thermocouple thermometer, and an integrated chip (IC) thermometer, but are not limited thereto.

When a registration command and identification information of a terminal are received, the first controller 190 registers the terminal capable of remote control on the basis of the received identification information.

Here, the identification information of the terminal may be at least one of a serial number and a phone number of the terminal.

When information of cooking using the first cooking portion 100*a* and a cooking start command are received, the first controller 190 controls operations of the cooling motor 133, the circulating motor 152 of the circulator, and the heating unit 140, which are the plurality of loads, on the basis of the received cooking information.

The first controller 190 controls driving of the heating unit 140 for the cooking compartment 110 to keep set cooking temperature on the basis of temperature of the cooking compartment 110 detected by the cooking compartment temperature detector.

The first controller 190 controls the circulating motor 152 so that high-temperature air generated by the heating unit 140 is uniformly transmitted to the inside of the cooking compartment 110.

While cooking is performed, the first controller 190 controls driving of the cooling motor 133 to cool the electric component room 130 so that electric components provided in the electric component room 130 are protected.

The first controller 190 checks whether the remote control mode has been selected when a cooking start command is received, when the remote control mode has not been selected, controls performance of cooking in the general control mode, and when the remote control mode has been selected, controls performance of cooking in the remote control mode.

Here, performing cooking in the general control mode includes changing cooking information on the basis of a control command input into the first input unit while cooking is being performed.

Performing cooking in the remote control mode includes transmitting monitoring information related to a cooking state of food to the terminal while cooking is being performed, and changing cooking information on the basis of a control command transmitted from the terminal 3.

Further, performing cooking in the remote control mode also includes changing cooking information on the basis of a control command input into the first input unit 171 while cooking is being performed.

The first controller 190 may be electrically connected to the monitorer 123 via a cable, or may also be connected to the monitorer 123 with wireless communication.

Such a first controller 190 transmits monitoring information monitored by the monitorer 123 to the terminal 3 while cooking is being performed in the remote control mode.

Further, in a case where the monitorer 123 is not provided, the first controller 190 may also transmit detected food temperature information as monitoring information to the terminal 3.

When the remote control mode is selected, the first controller 190 controls output of information that requests setting of remote control available time, and when information on the remote control available time is received via the first input unit 171 or when information on the remote control available time input into the terminal 3 is received, the first controller 190 sets time during which the remote control with the terminal 3 is available on the basis of the received information on the remote control available time.

Here, the information on the remote control available time is a time until remote control using the terminal is ended, and includes information on additional time during which the remote control mode may be maintained from a time point at which cooking is finished.

For example, in a case where 30 minutes of additional time is set as the remote control available time, when a cooking start time point is 1 pm, and a cooking finish time point is 2 pm, the first controller sets a time until 2:30 pm as the remote control available time.

That is, a user may remotely control a cooking appliance using a terminal from a time point at which the remote control mode is input to a cooking finish time point, and furthermore, additionally perform the remote control of the cooking appliance until a time set by the user after the cooking finish time point.

Further, information on the remote control available time may also include information on a date, time, minutes, and seconds at which the remote control mode will be ended.

For example, in a case where the remote control available time is set as 3:30 pm, the first controller may set a time until 3:30 pm as the remote control available time regardless of a cooking start time point and a cooking finish time point.

In a case where the remote control available time is set as 3:30 am on Dec. 31, 2015 in a state in which cooking start date and time are 10 pm on Dec. 30, 2015, the first controller may set a time until 3:30 am on Dec. 31, 2015 as a time until which remote control is available regardless of the cooking start time point and the cooking finish time point.

In a case where the remote control available time is not set by the user, the first controller 190 may also set a preset remote control available time as a time until which remote control with the terminal 3 is available.

For example, in a case where the preset remote control available time is set as 30 minutes, when a cooking finish time point is 2 pm, the first controller sets a time until 2:30 pm as the remote control available time.

When a command to not set a remote control available time is input from a user, the first controller 190 may also end the remote control mode at a cooking finish time point.

When cooking of food is finished while cooking is being performed in the remote control mode, the first controller 190 checks remote control available time from the time point at which cooking is finished, and transmits information on the checked remote control available time to the terminal 3.

The first controller 190 controls operation of at least one of a plurality of loads on the basis of a control command transmitted from the terminal 3 or a control command input into the first input unit while cooking is being performed in the remote control mode.

More specifically, the first controller 190 checks cooking information corresponding to a received control command, changes cooking information stored in the first storage 191 on the basis of the checked cooking information, and controls operation of at least one load on the basis of the changed cooking information.

Here, the cooking information corresponding to the received control command may include information on cooking end time and cooking temperature.

The first controller 190 controls operation of at least one of the plurality of loads on the basis of a control command input into the first input unit 171 while cooking is being performed in the general control mode.

That is, in the general control mode, since communication with the terminal 3 is blocked and thus it is impossible to receive a control command from the terminal 3, operation of at least one load is controlled in accordance with a control command input into the first input unit.

The first controller 190 checks whether the door 120 is open on the basis of door open or close information detected by the door open or close detector while cooking is being performed in the remote control mode, and when the door 120 is in the open state, cancels the remote control mode even when time is left until the remote control available time.

When a remote control mode cancel command is input into the first input unit 171 while cooking is being performed or after cooking is finished in the remote control mode, the first controller 190 cancels the remote control mode.

The first controller 190 counts performance time of the remote control mode from a time point at which the remote control mode is input into the first input unit 171, compares the counted performance time with a maximum time limit, and when the counted performance time exceeds the maximum time limit, cancels the remote control mode.

Here, canceling the remote control mode includes blocking communication with the terminal 3.

The maximum time limit may be about 72 hours.

When the remote control mode cancel command input into the first input unit 171 is received while the performance time of the remote control mode is being counted, the first controller 190 initializes the counted performance time of the remote control mode.

When the remote control mode input into the first input unit 171 is received after the performance time of the remote control mode is initialized, the first controller 190 re-counts performance time of the remote control mode from a time point at which the remote control mode is input.

The first controller 190 checks operational states of a plurality of heating plates 160 of the second cooking portion, and transmits information on the checked operational states of the plurality of heating plates 160 to the terminal 3.

The first controller 190 may be a central processing unit (CPU), a micro-processing unit (MCU), or a processor.

Such a first controller 190 may include a read-only memory (ROM) in which a control program for controlling the cooking appliance 1 is stored, and a random access memory (RAM) configured to store signals or data input from the outside of the cooking appliance 1 or used as a storage area for various tasks performed in the cooking appliance 1.

The first controller 190 may store a control program for controlling the cooking appliance 1, a graphical user interface (GUI) related to an application provided from a manufacturer or downloaded from the server, images for providing the GUI, user information, documents, databases, or related pieces of data.

The first storage 191 stores identification information of the terminal 3 capable of the remote control, information on the AP 2, and information on the server 4.

The first storage 191 stores information on the remote control available time set by the user.

Here, the information on the remote control available time includes information on additional time during which the remote control mode will be maintained from a time point at which cooking is finished.

Further, the information on the remote control available time may also include information on a date, time, minutes, and seconds at which the remote control mode will be ended.

The first storage 191 may also store preset remote control available time which will be automatically set in a case where information on the remote control available time is not set by the user.

The first storage 191 may further store information on a maximum time limit of the remote control mode.

Here, the information on the maximum time limit may be information set at the time of manufacturing the cooking appliance, or may be changed by the user.

The first storage 191 may store food cooking information and monitoring information input via the first input unit and the terminal.

The first storage 191 may also store cooking temperature and cooking performance time for each cooking mode.

The first storage 191 may include a high-speed RAM, a magnetic disk, a static RAM (SRAM), a dynamic RAM (DRAM), a ROM, or the like, but is not limited thereto.

The first storage 191 may be detachable from the cooking appliance.

For example, the first storage 191 may include a compact flash (CF) card, a secure digital (SD) card, a smart media (SM) card, a multimedia card (MMC), or a memory stick, but is not limited thereto.

The first communicator 192 may transmit/receive information to/from the terminal 3 via the AP 2 and the server 4.

More specifically, the first communicator 192 may transmit cooking time, cooking temperature, and monitoring information of the cooking appliance 1 to the terminal 3 by control by the first controller 190.

The first communicator 192 may transmit information corresponding to start of cooking and finish of cooking of the cooking appliance 1 and information on opening of the door of the cooking appliance 1 to the terminal 3.

The first communicator 192 may also transmit the remote control mode and information on the remote control available time to the terminal.

The first communicator 192 receives a control command input into the terminal 3 and transmits the received control command to the first controller 190.

The first communicator 192 may also transmit and receive information to and from the terminal 3 through the server 4.

The plurality of loads may include the heating unit 140 configured to provide heat to the inside of the cooking compartment, the circulating motor 152 of the circulator 150 configured to circulate air inside the cooking compartment, and the cooling motor 133 configured to cool the electric component room.

The plurality of loads may further include the plurality of heating plates 160 provided in the second cooking portion.

Figure 6:
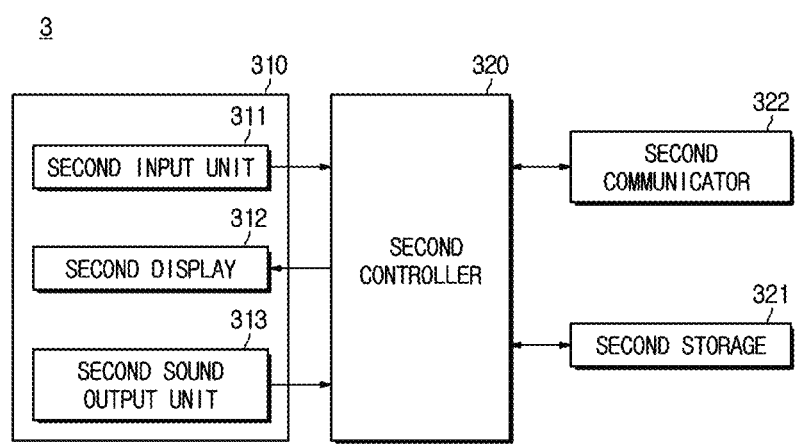
FIG. 6 is a control configuration diagram of a terminal that performs communication with a cooking appliance according to an embodiment.

FIG. 6 is a control configuration diagram of the terminal 3 that performs communication with a cooking appliance according to an embodiment.

The terminal 3 is a device that is mobile and portable, capable of wired and wireless communications, and in which an application may be installed, and may include a mobile phone, a smartphone, a tablet, a laptop, or a desktop computer.

The terminal 3 may control operation (for example, start of cooking, finish of cooking, setting of cooking information, and setting of remote control available time) of a cooking appliance 1.

The terminal 3 may display an operational state (for example, a degree of cooking of cooked food that is being cooked) of the cooking appliance 1 through an application installed therein.

Such a terminal 3 includes a second user interface 310, a second controller 320, a second storage 321, and a second communicator 322.

The second user interface 310 receives a control command during the remote control mode of the cooking appliance 1, and displays monitoring information of the cooking appliance.

Such a second user interface 310 includes a second input unit 311 configured to receive a control command, and a second display 312 configured to display monitoring information of the cooking appliance with an image.

The second user interface 310 also includes a second sound output unit 313 configured to output monitoring information of the cooking appliance with sound.

The second user interface 310 may be implemented with a touchscreen in which a touch panel, which is the second input unit 311, and a display panel, which is the second display 312, are integrated.

The touchscreen, which is the second user interface 310, may provide a GUI corresponding to various services (for example, voice call, video call, information transmission, reception of broadcasting, taking a picture, watching a moving picture, or running an application) to a user.

The second sound output unit 313 may output cooking start information, cooking finish information, information on an end of remote control available time, and the like with sound.

The touchscreen, which is the second user interface 310, converts an analog signal corresponding to a detected single touch or multi-touch into a digital signal and transmits the digital signal to the second controller 320.

The second controller 320 may calculate an X-coordinate and a Y-coordinate corresponding to a touch position using the received digital signal, and check a command of a button icon corresponding to the calculated coordinates.

When an application for remotely controlling a cooking appliance is run, the second controller 320 controls communication with the cooking appliance, controls output of information that requests input of remote control available time, and when the remote control available time is input, stores the input remote control available time and transmits the stored remote control available time to the cooking appliance 1.

The second controller 320 controls output of food monitoring information transmitted from the cooking appliance 1, and when a control command input into the second input unit 311 is received, controls transmission of the received control command.

The second controller 320 outputs information on the remote control available time of the remote control mode, receives information on opening or closing of the door, and controls output of the received information on opening or closing of the door.

The second controller 320 ends the remote control mode of the cooking appliance when a remote control mode cancel signal is received from the cooking appliance.

The second controller 320 may also automatically cancel the remote control mode when the remote control available time has elapsed.

The second controller 320 may also control output of information that blocks communication with the cooking appliance when the remote control available time has elapsed.

The second storage 321 may store information on remote control available time set by the user and store identification information of the cooking appliance 1 and information on the server 4.

The second storage 321 may also store monitoring information and cooking information.

The second communicator 322 performs communication with the cooking appliance 1 via the AP 2 and the server 4.

The second communicator 322 receives cooking information and monitoring information of the cooking appliance 1, transmits the received cooking information and monitoring information to the second controller 320, and transmits a control command input into the second input unit 311 in accordance with a command of the second controller 320.

The second communicator 322 may be implemented with a wired network such as a LAN, a wide area network (WAN), or a value added network (VAN), or a wireless network such as a mobile radio communication network, a short-range communication network, or a satellite communication network.

The second communicator 322 may connect to the cooking appliance 1 or the server 4 via a mobile communication network using one or more antennas by control by the second controller 320.

The second communicator 322 may be wirelessly connected to the AP 2 at a location at which the AP 2 is installed by control by the second controller 320.

The AP 2 may include Wi-Fi.

Short-range communication may include Bluetooth, BLE, IrDA, UWB, and/or NFC.

Figure 7:
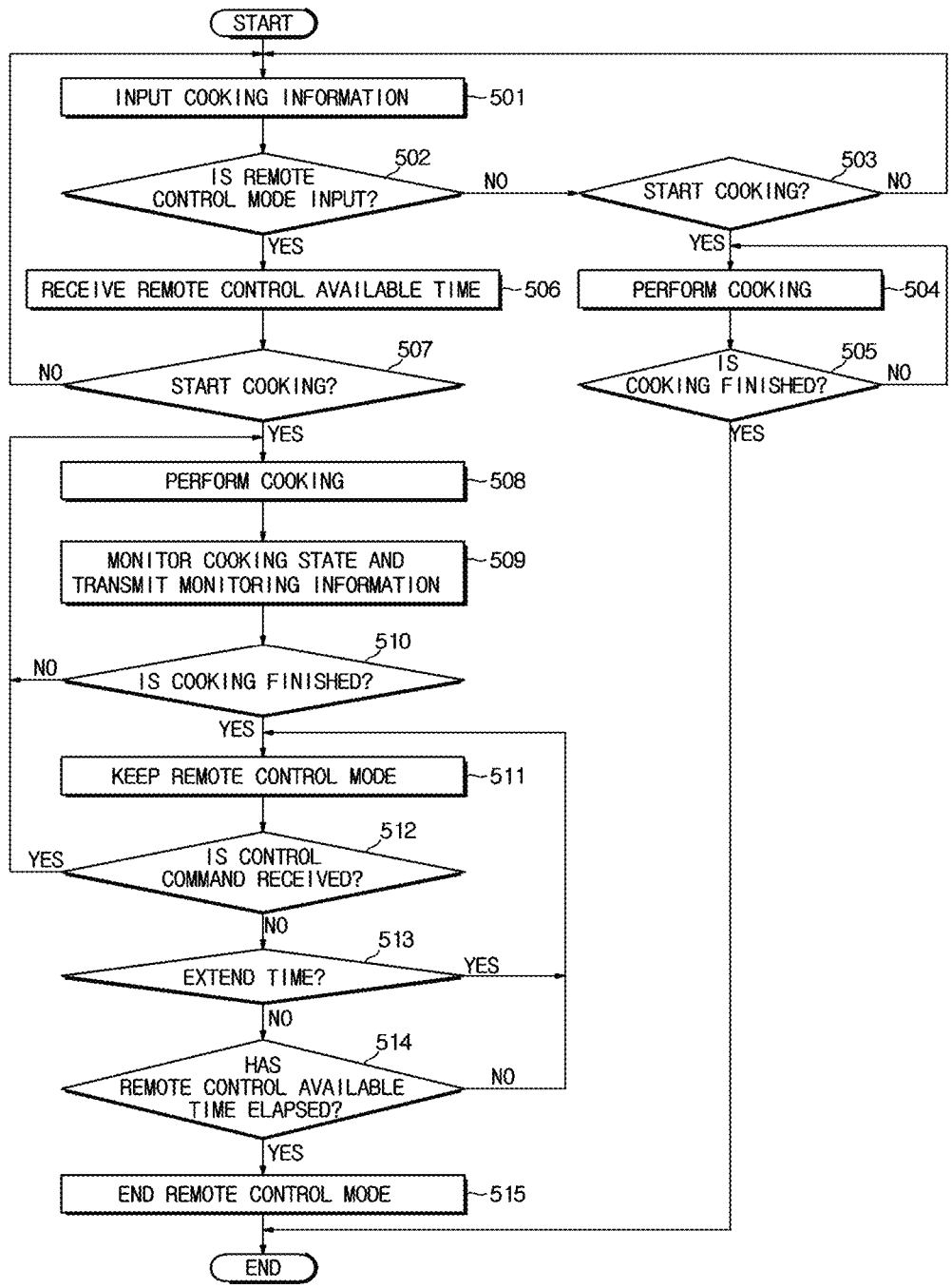
FIG. 7 is a first control flowchart of a cooking appliance according to an embodiment.

FIG. 7 is a first control flowchart of a cooking appliance according to an embodiment.

When turned on, a cooking appliance receives cooking information via a first input unit 171 (501), and determines whether a remote control mode has been input via the first input unit 171 (502).

When it is determined that the remote control mode has not been input, the cooking appliance performs cooking of food in a general control mode.

The performing of the cooking of food in the general control mode includes, when a cooking start command is input (503), performing cooking of food by operating a plurality of loads on the basis of input cooking information (504), determining whether cooking of the food is finished while performing cooking of the food (505), and when it is determined that the cooking is finished, stopping operation of the plurality of loads.

The performing of the cooking of food includes operating a heating unit 140 so that a cooking compartment 110 maintains input cooking temperature on the basis of temperature of the cooking compartment 110 detected by a cooking compartment temperature detector, operating a circulating motor 152 so that high-temperature air generated by the heating unit 140 is uniformly transmitted to the inside of the cooking compartment 110, and operating a cooling motor 133 so that an electric component room 130 may be cooled when cooking is performed.

The determining of whether cooking is finished may include determining whether cooking finish time has elapsed.

Here, the cooking finish time may be a cooking finish time automatically set corresponding to a cooking mode or may also be a cooking finish time set by a user.

The stopping of the operations of the plurality of loads may include stopping operations of the heating unit and the circulator first and then stopping the cooling fan configured to cool the electric component room and the cooking compartment afterwards.

When it is determined that the remote control mode has been input, the cooking appliance performs communication with a terminal 3.

Further, when the cooking appliance is in a state in which the remote control mode is input via the first input unit 171, the cooking appliance may also receive cooking information via the terminal 3.

The cooking appliance transmits information that requests input of remote control available time to the terminal.

When the remote control available time transmitted from the terminal is received (506), the cooking appliance sets the received remote control available time as a time until which remote control with the terminal is available.

Further, the cooking appliance may also directly receive the remote control available time via the first input unit 171.

Here, the remote control available time is a time during which remote control is to be performed after a time point at which cooking is finished, and may be an additional time in which communication with the terminal is maintained.

When the cooking start command is input (507), the cooking appliance performs cooking of food on the basis of cooking information (508), monitors a cooking state of food inside the cooking compartment using a monitorer while cooking is being performed and transmits monitored monitoring information to the terminal (509).

The cooking appliance determines whether a control command has been received via the terminal or the first input unit while performing cooking of food and monitoring, and when it is determined that a control command has been received, controls operation of at least one of the plurality of loads on the basis of the received control command.

For example, when the received control command is a change in cooking temperature, the cooking appliance changes cooking temperature corresponding to initially input cooking information into cooking temperature corresponding to the received control command.

When the received control command is a pause of cooking, the cooking appliance pauses operations of the plurality of loads.

The cooking appliance determines whether cooking of food has been finished while performing cooking of food and monitoring (510), when it is determined that the cooking of food has been finished, checks time of a time point at which the cooking is finished, and maintains the remote control mode from the checked time to the remote control available time (511).

For example, in a case where the remote control available time is set as 30 minutes, when time at which cooking is finished is 1 pm, the cooking appliance maintains the remote control mode until 1:30 pm.

Here, the determining of whether cooking has been finished includes determining whether cooking finish time has elapsed.

The cooking finish time may be a cooking finish time automatically set corresponding to a cooking mode, or may also be a cooking finish time set by a user.

The cooking appliance determines whether a control command has been received from the terminal in a state in which the remote control mode is maintained (512), and when it is determined that a control command has been received, controls operation of at least one load of the plurality of loads on the basis of the received control command.

For example, when the received control command is additional cooking, the cooking appliance re-operates the plurality of loads to perform additional cooking of food inside the cooking compartment, and performs the additional cooking of food on the basis of cooking time and cooking temperature corresponding to the additional cooking.

That is, remote control of the cooking appliance may be possible even after cooking is finished.

Accordingly, since the user can check a cooking state of cooked food on the basis of monitoring information and additionally perform cooking in accordance with the cooking state of food, the level of satisfaction for cooking food can be improved.

When time extension information is received from the terminal while the remote control mode is being maintained after cooking of food is finished, the cooking appliance changes setting of the remote control available time on the basis of the received time extension information and maintains the remote control mode until the changed remote control available time.

For example, in a case where the remote control available time is extended by 30 minutes in a state in which the remote control available time is until 1:30 pm, the cooking appliance maintains the remote control mode until 2 pm.

In this way, by extending the remote control available time, the remote control may be made possible even after additional cooking of food. That is, the user can secure the remote control available time.

The cooking appliance determines whether the remote control available time has elapsed while maintaining the remote control mode (514), and when it is determined that the remote control available time has elapsed, ends the remote control mode (515).

That is, the cooking appliance blocks communication with the terminal.

Further, when the door is open or a remote control mode cancel command is input via the first input unit while cooking is being performed in the remote control mode, the cooking appliance cancels the remote control mode even when time is left until the remote control available time.

Figure 8:
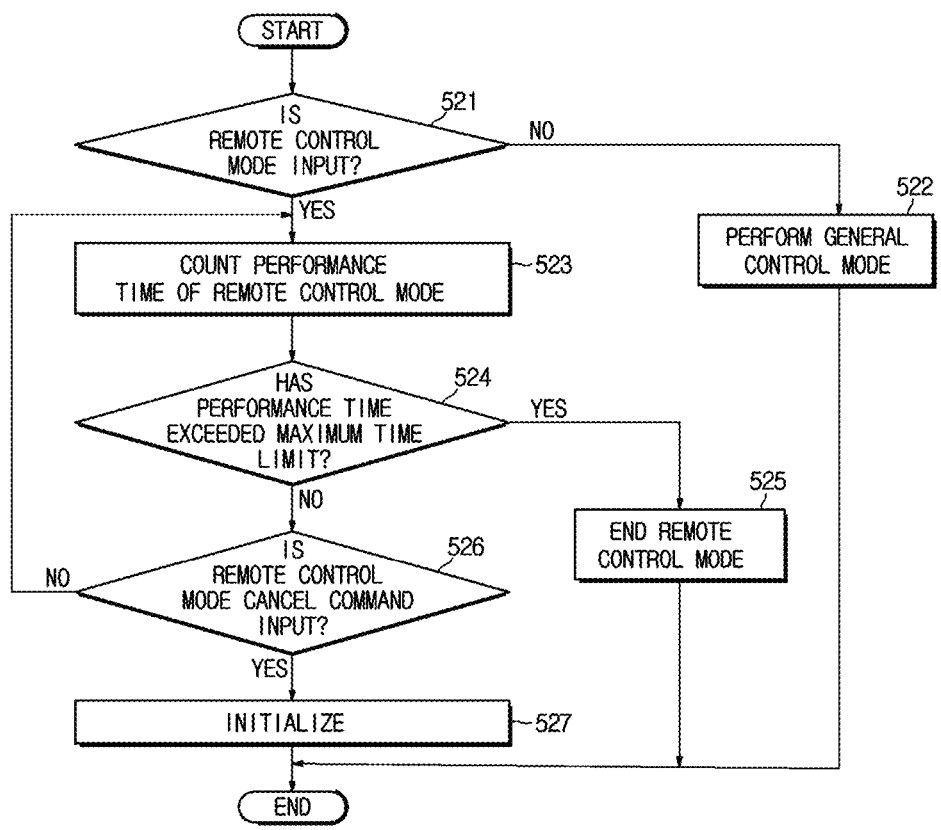
FIG. 8 is a second control flowchart of a cooking appliance according to an embodiment.

FIG. 8 is a second control flowchart of a cooking appliance according to an embodiment.

When turned on, a cooking appliance determines whether a remote control mode has been input via a first input unit 171 (521).

When cooking information and cooking start information are input in a state in which the remote control mode has not been input, the cooking appliance performs cooking of food in a general cooking mode (522).

Since the performing of the cooking of food in the general control mode is the same as Operations 503, 504, and 505 of FIG. 7, description thereof will be omitted.

When it is determined that the remote control mode has been input, the cooking appliance performs communication with a terminal 3. In this case, the cooking appliance counts performance time of the remote control mode (523).

When cooking information and a cooking start command are received in a state of the remote control mode, the cooking appliance operates a plurality of loads, performs cooking of food, and when it is determined that the cooking of food has been finished, stops operation of the plurality of loads.

Then, the cooking appliance maintains the remote control mode with the terminal on the basis of remote control available time set by a user, and determines whether performance time of the remote control mode has exceeded a preset maximum time limit while the remote control mode is being maintained (524).

Here, the preset maximum time limit may be about 72 hours.

The performance time of the remote control mode of the cooking appliance may be extended by time information set by the user.

Further, the cooking appliance may count the performance time of the remote control mode even when the remote control mode is input in a state in which cooking of food is not performed. In this case, by automatically ending the remote control mode when the performance time of the remote control mode exceeds the maximum time limit, hacking from the outside can be minimized.

When it is determined that the performance time of the remote control mode is less than or equal to the preset maximum time limit, the cooking appliance continues to maintain the remote control mode, and when it is determined that the performance time of the remote control mode has exceeded the preset maximum time limit, the cooking appliance ends the remote control mode (525).

Here, the ending of the remote control mode may include displaying remote control mode end information through a first display of the cooking appliance, outputting remote control mode end information with sound through a first sound output unit, or transmitting remote control mode end information to the terminal.

The ending of the remote control mode includes blocking communication with the terminal 3.

The cooking appliance determines whether a remote control mode cancel command has been input while the remote control mode is maintained (526), and when it is determined that the remote control mode cancel command has been input, initializes the counted performance time of the remote control mode (527).

Here, the determining of whether the remote control mode cancel command has been input includes determining whether door open information has been input or determining whether the remote control mode cancel command has been input into the first input unit 171.

Then, when the remote control mode is input into the first input unit 171 after the performance time of the remote control mode is initialized, the cooking appliance re-counts the performance time of the remote control mode from a time point at which the remote control mode is input.

Figure 9:
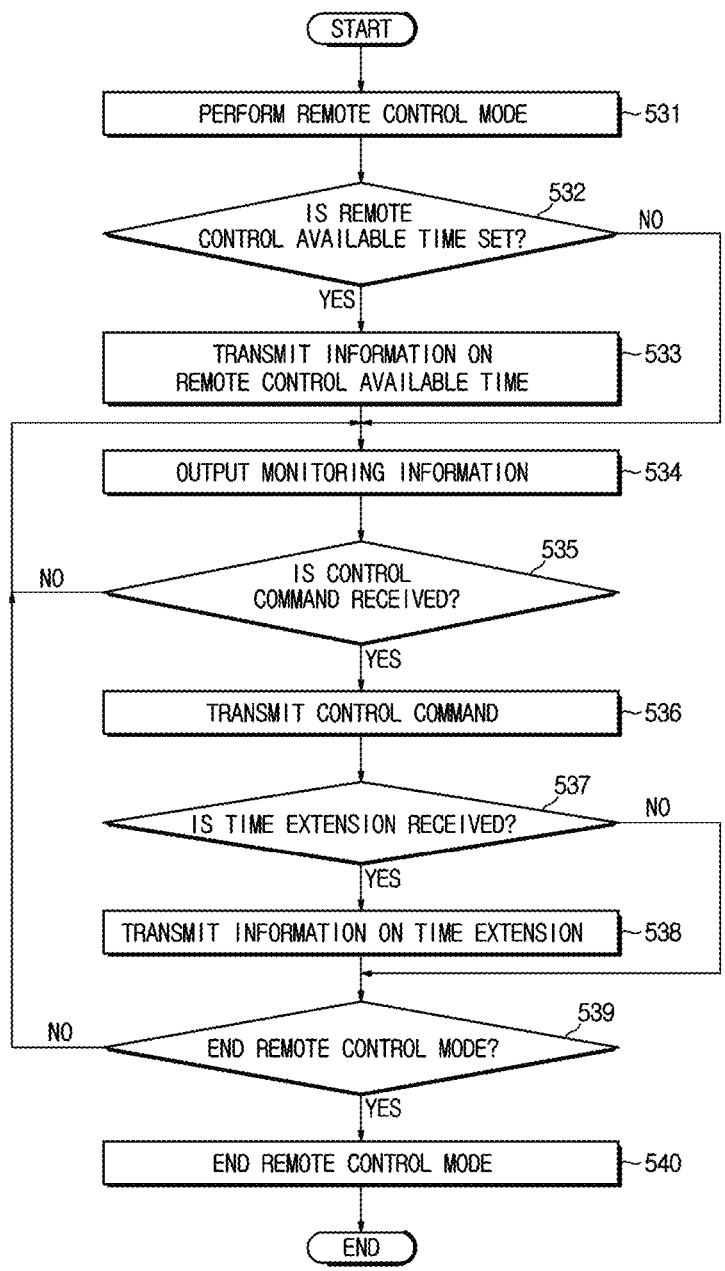
FIG. 9 is a control flowchart of a terminal performing communication with a cooking appliance according to an embodiment.

FIG. 9 is a control flowchart of a terminal performing communication with a cooking appliance according to an embodiment. FIGS. 10 to 14 are exemplary diagrams of control of the terminal.

Figure 10:
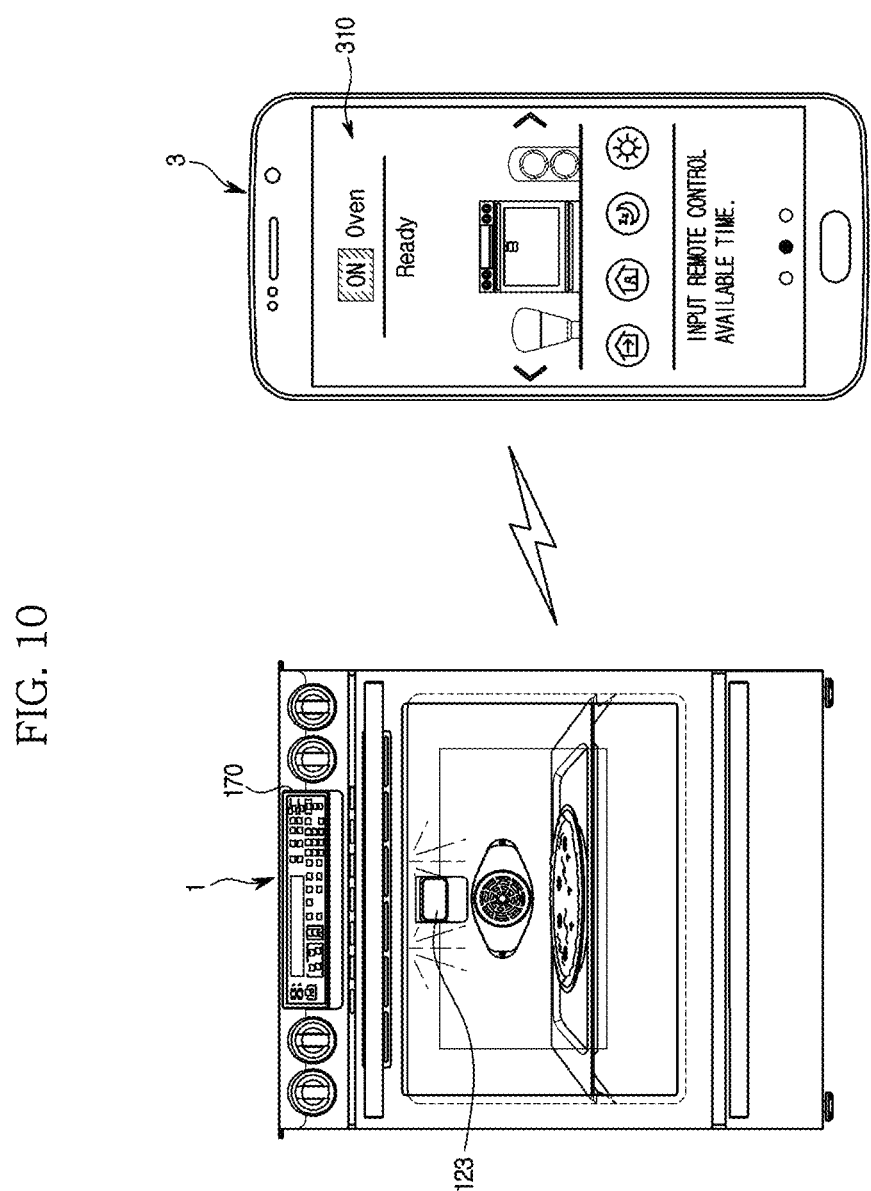
FIGS. 10 to 14 are exemplary diagrams of display control of a terminal performing communication with a cooking appliance according to an embodiment.

As illustrated in FIG. 10, when an application for remotely controlling a cooking appliance is run, a terminal 3 displays an execution screen of the application on a second user interface 310, and performs communication with the cooking appliance to perform a remote control mode of the cooking appliance (531).

When the remote control mode is performed, the terminal outputs information that requests input of remote control available time.

Here, the outputting of the information that requests input of the remote control available time includes outputting via at least one of a second display and a second sound output unit of the second user interface 310.

Figure 11:
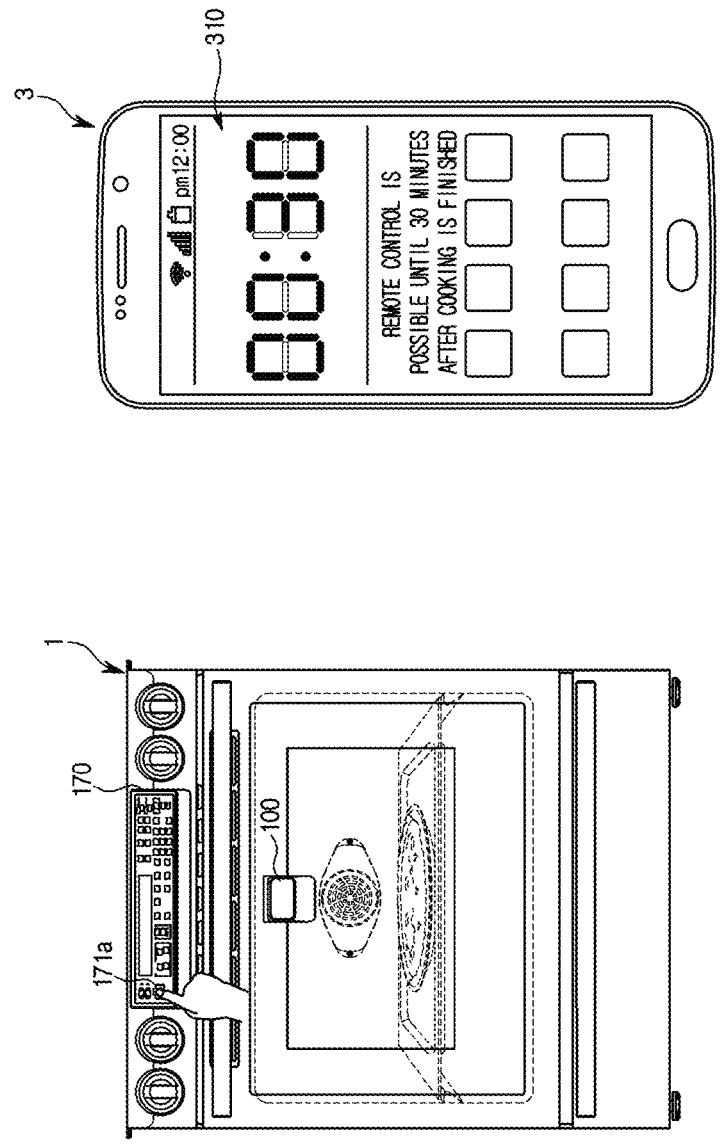

As illustrated in FIG. 11, when the remote control available time is input by a user, the terminal 3 displays the input remote control available time and guidance information related to the remote control available time on the second user interface 310.

When it is determined that the remote control available time has been set by the user (532), such a terminal 3 transmits information on the remote control available time to the cooking appliance (533).

The terminal may receive cooking information and monitoring information from the cooking appliance after input is made on a cooking start button 171*a* of the cooking appliance.

Figure 12:
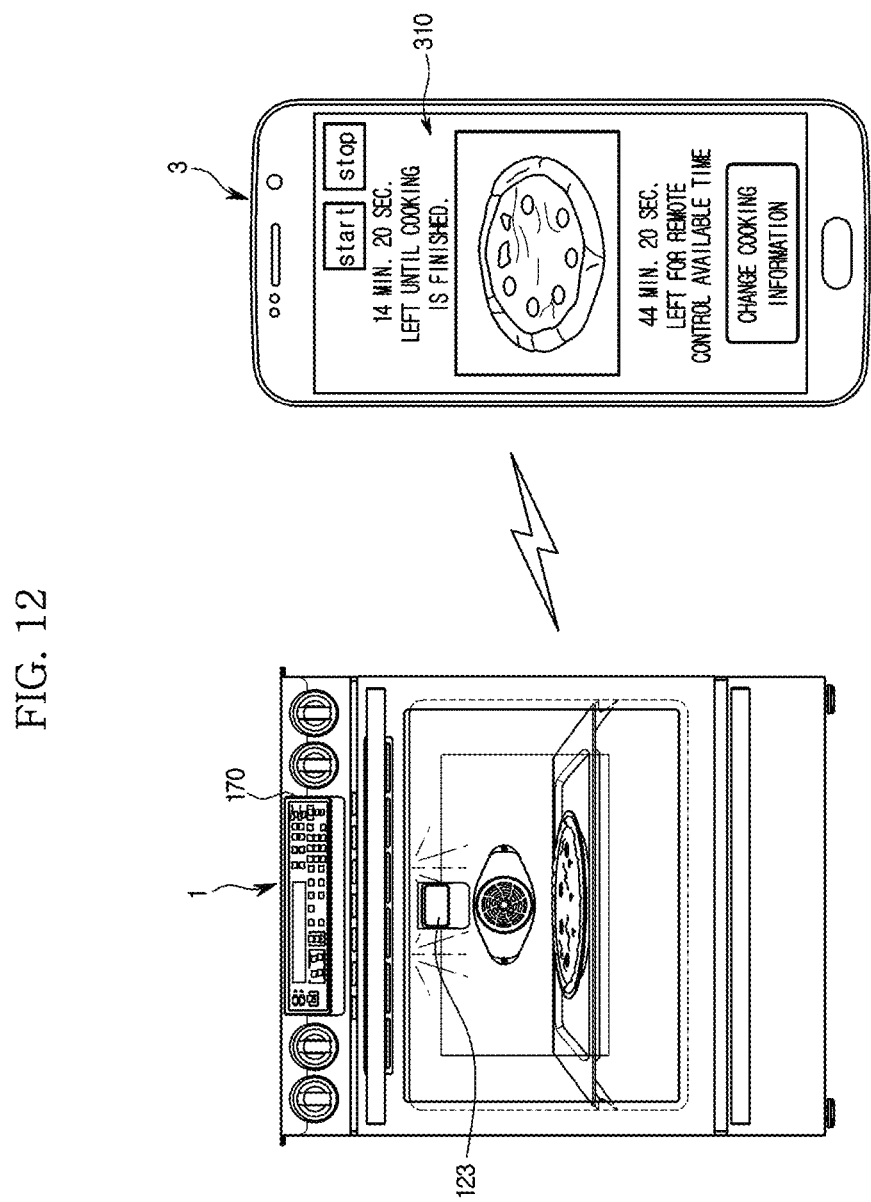

As illustrated in FIG. 12, the terminal 3 outputs cooking information of food and monitoring information of the food (534).

Here, the cooking information of food may include information on time left until cooking finish time, and the monitoring information of food may include a cooking image of the food.

The terminal 3 may display the remote control available time.

Here, the remote control available time may be a time that results from adding an amount of time set by the user to time of a time point at which cooking is finished.

That is, the user may input a remote control command even while cooking is being performed, and input a remote control command even within additional time after cooking is finished.

When a control command input into a second input unit 311 is received (535), the terminal transmits the received control command to the cooking appliance (536), and when time extension information input into the second input unit 311 is received (537), the terminal transmits the received time extension information to the cooking appliance (538).

Here, the control command may include at least one of a cooking pause command, a cooking stop command, a cooking temperature change command, and a cooking time change command.

Figure 13:
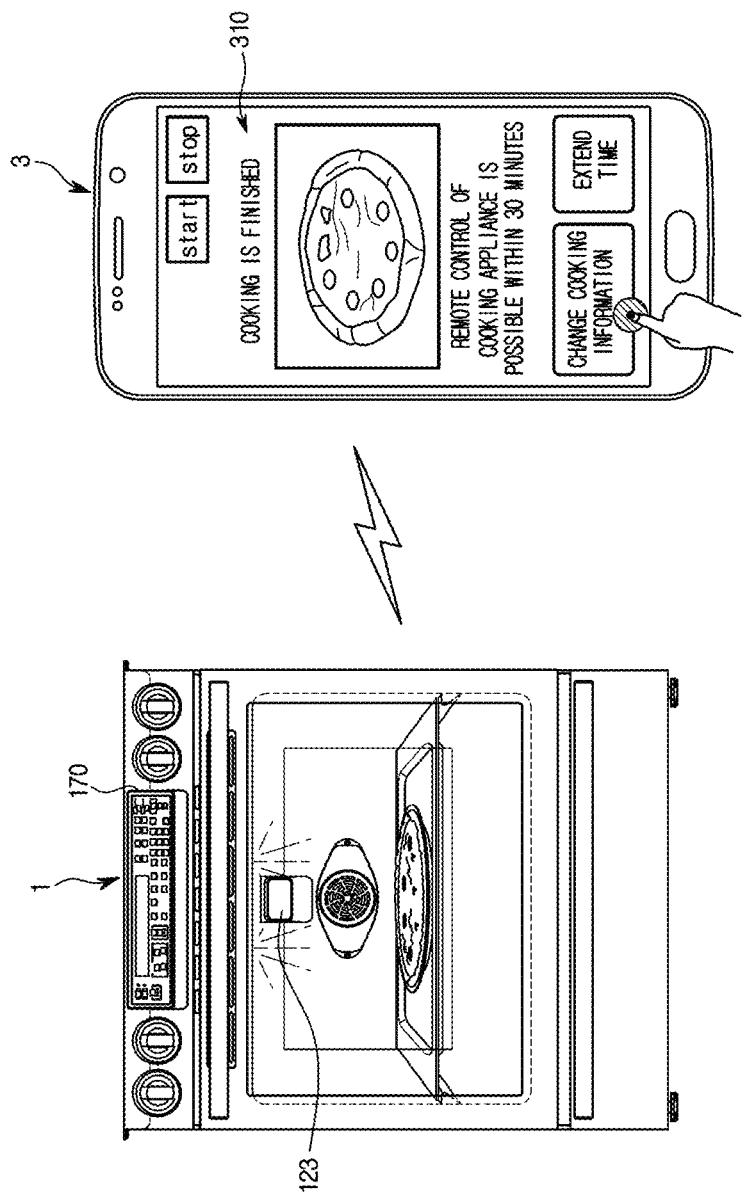

As illustrated in FIG. 13, when cooking finish information and monitoring information are received, the terminal 3 displays the cooking finish information and a cooked state of food inside a cooking compartment with an image, and displays the remote control available time after cooking is finished.

Then, the terminal 3 displays pieces of information that may be selected by the user for the user to additionally perform remote control of cooking appliance during the remote control available time after cooking is finished.

The terminal determines whether a remote control mode end command has been received (539), and when it is determined that the remote control mode end command has been received, ends the remote control mode (540).

That is, the terminal ends communication with the cooking appliance.

The terminal may also check a current time, and when the checked current time is determined as the remote control available time, automatically end the remote control mode.

Then, the terminal outputs information on the remote control available time of the remote control mode, receives information on opening or closing of a door, and controls output of the received door opening or closing information.

Figure 14:
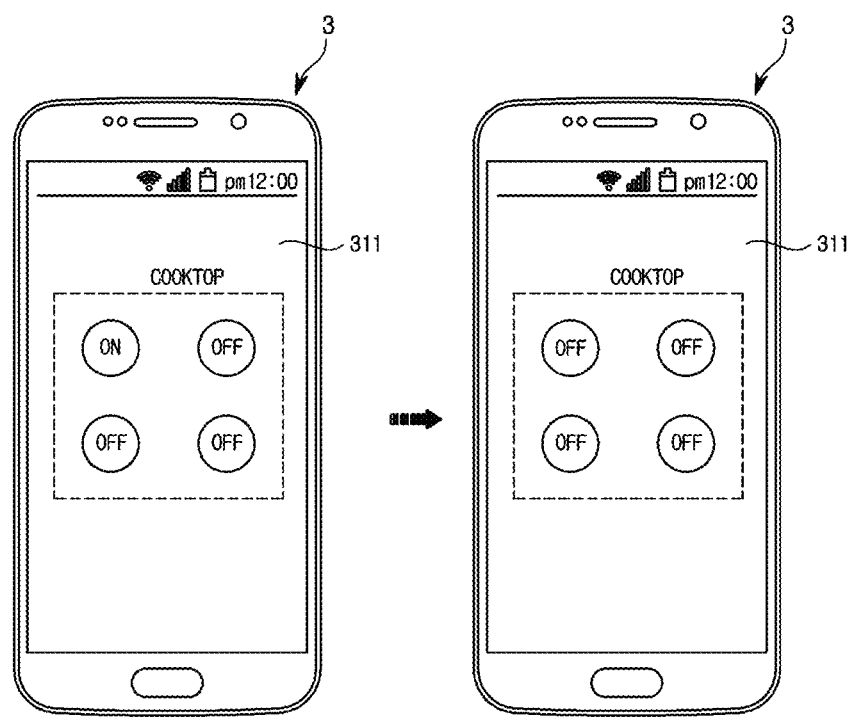

As illustrated in FIG. 14, in a case where a second cooking portion of the cooking appliance is being operated, the terminal 3 may display an on or off operational state of the second cooking portion (that is, cooktops) for each heating plate.

Further, the terminal 3 may also display a heating level of a heating plate being operated.

Then, when an operational state of any one heating plate is changed after a predetermined amount of time elapses, the terminal 3 re-displays the changed operational state of the heating plate.

When the first cooking portion and the second cooking portion are being operated simultaneously, the terminal may display pieces of monitoring information (e.g., cooking information, operational state information) of the first cooking portion and the second cooking portion together, or may only display monitoring information of any one of the first cooking portion and the second cooking portion by the user's choice.

Figure 15:
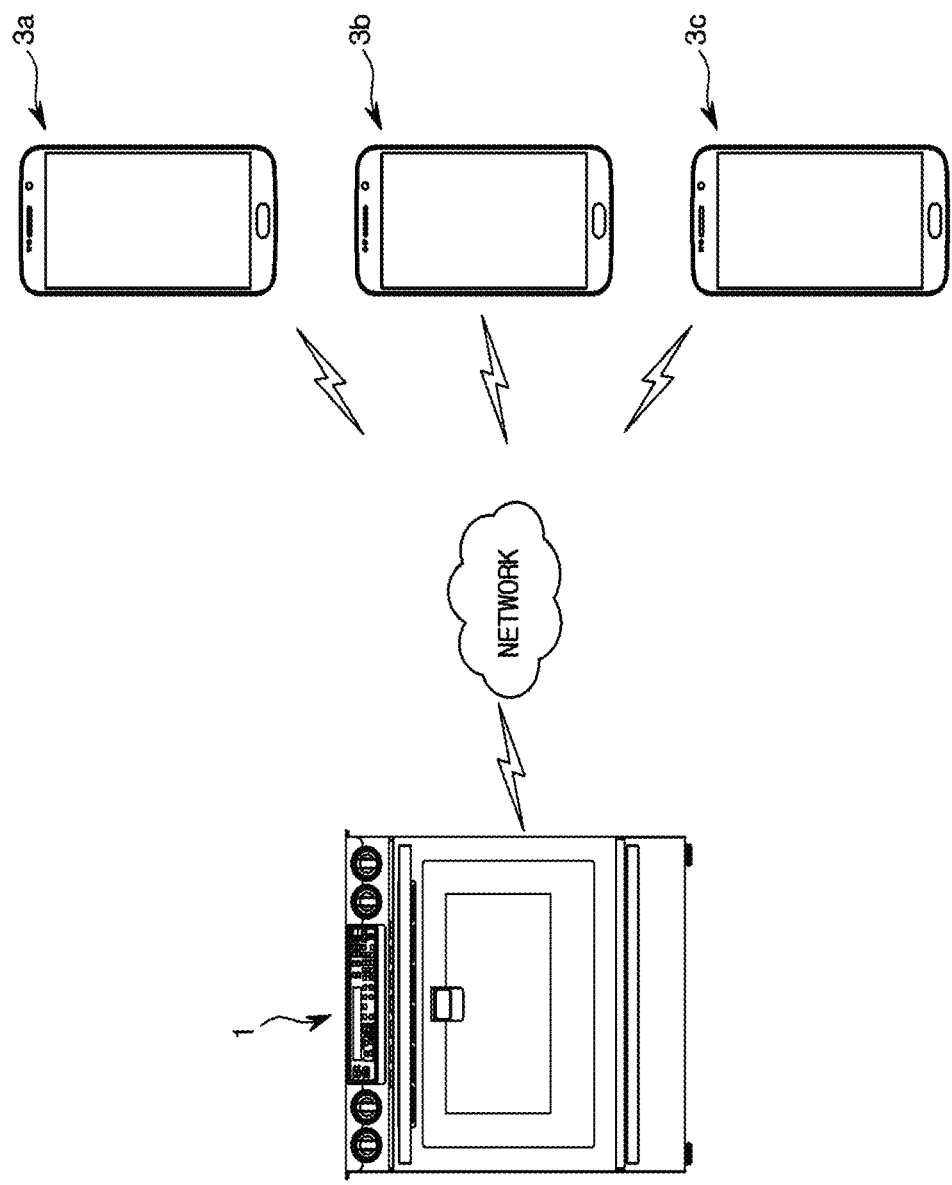
FIG. 15 is an exemplary diagram of remote control of a cooking appliance according to another embodiment.

FIG. 15 is an exemplary diagram of a home network system including a cooking appliance according to another embodiment. FIG. 15 will be described with reference to FIGS. 16 and 17.

Figure 16:
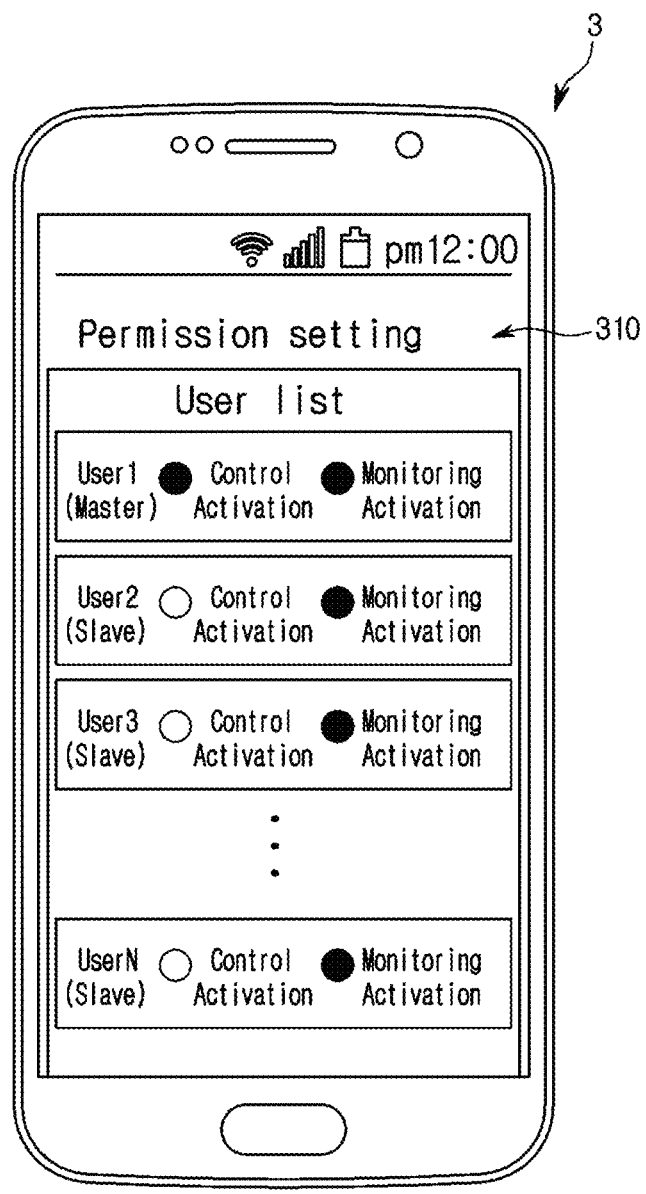
FIG. 16 is an exemplary diagram of setting terminals in FIG. 15 as a master and slaves.
Figure 17:
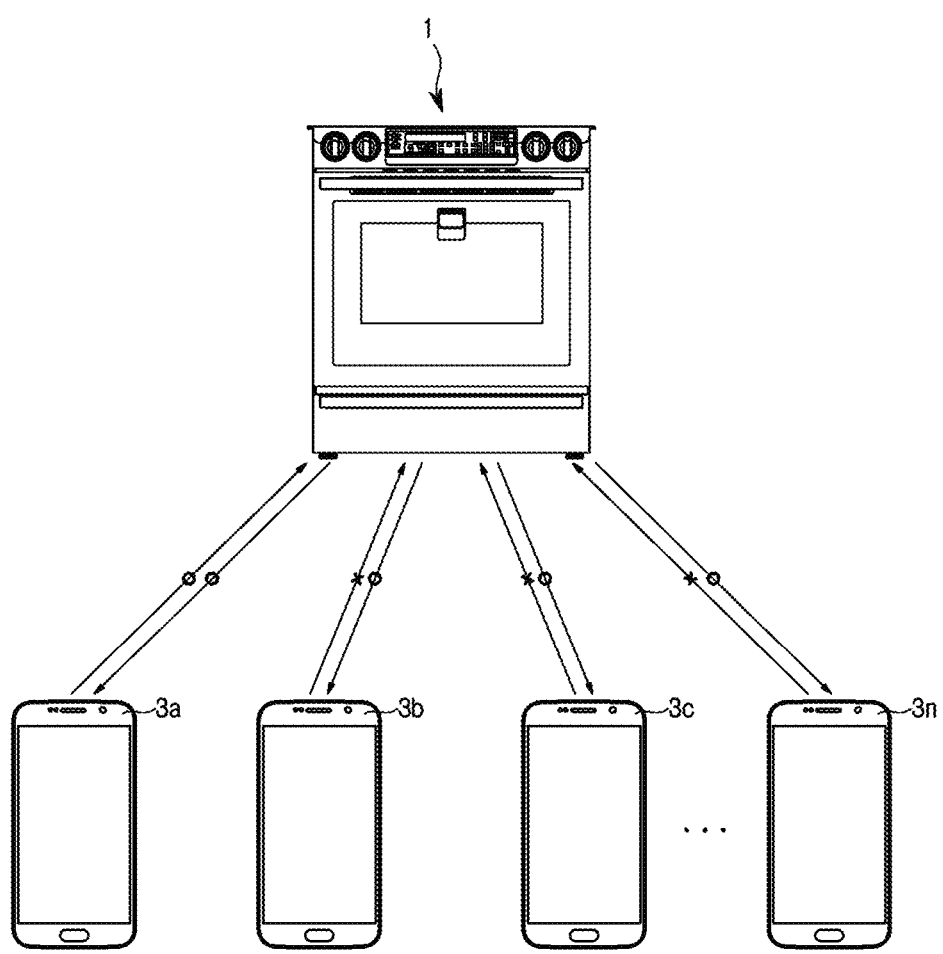
FIG. 17 is an exemplary diagram of setting control authority between the cooking appliance and the plurality of terminals illustrated in FIG. 15.

FIG. 16 is an exemplary diagram of setting terminals communicating with the cooking appliance as a master and slaves according to another embodiment, and FIG. 17 is an exemplary diagram of control authority of a plurality of terminals communicating with the cooking appliance according to another embodiment.

Unlike the above-described cooking appliance according to an embodiment, a cooking appliance 1 according to another embodiment performs communication with a plurality of terminals 3*a*, 3*b*, and 3*c*.

Since configuration of setting remote control available time of the cooking appliance 1 and configuration of canceling a remote control mode of the cooking appliance 1 are the same as those of the above-described cooking appliance 1 according to an embodiment, description thereof will be omitted.

The cooking appliance 1 according to another embodiment stores pieces of identification information of the plurality of terminals and stores master or slave setting information for each of the plurality of terminals.

When setting change information is received from a server, the cooking appliance 1 may change the pieces of master or slave setting information of the plurality of terminals on the basis of the received setting change information and store the changed pieces of master or slave setting information.

The cooking appliance 1 transmits cooking information and monitoring information to a terminal set as a master, and when a control command transmitted from the terminal set as the master is received, changes the cooking information or operational information (e.g., pause cooking, stop cooking) on the basis of the received control command.

The cooking appliance 1 transmits cooking information and monitoring information to a terminal set as a slave.

The plurality of terminals 3*a*, 3*b*, and 3*c* perform communication with the server, receive monitoring information of the cooking appliance 1 via an AP and the server, and output the received monitoring information.

A terminal set as a master from among the plurality of terminals 3*a*, 3*b*, and 3*c* has control authority over the cooking appliance. That is, the terminal set as the master may transmit a control command input by a user to the cooking appliance.

Further, the terminal set as the master from among the plurality of terminals may also activate all of a monitoring on/off button, a control command button, and an option setting button, and a terminal set as a slave may only activate the monitoring on/off button and deactivate the control command button and the option setting button.

As illustrated in FIG. 16, the terminal 3*a* set as the master may set master or slave setting and control authority related to a plurality of terminals.

The terminal 3*a* set as the master displays an approval setting window when the option setting button is selected, receives selection of pieces of setting information related to the plurality of terminals, sets the plurality of terminals as a master or slave and controls authority thereof on the basis of the pieces of selected information, and stores the settings.

The terminal 3*a* set as the master may transmit the setting information to the server and the cooking appliance.

The server stores master setting information and slave setting information related to the plurality of terminals for each user.

The server assigns control authority only to a terminal set as a master.

As illustrated in FIG. 17, when a control command is transmitted from the terminal 3*a* set as the master, the server transmits the control command to the cooking appliance 1, and when monitoring information is received from the cooking appliance, transmits the received monitoring information to the terminal 3*a* set as the master.

However, when a control command is transmitted from the terminals 3*b*, 3*c*, . . . , 3*n* set as slaves, the server blocks transmission of the control command to the cooking appliance 1.

However, the server allows monitoring information transmitted from the cooking appliance 1 to be transmitted to the terminals 3*b*, 3*c*, . . . , 3*n* set as the slaves.

Further, when master setting change information is received from the terminal set as the master, the server changes a terminal to be set as a master on the basis of the received master setting change information, and the terminal that has been previously set as the master is changed and set as a slave.

What is claimed is:

1. A cooking appliance comprising:
    a transceiver configured to perform communication with a terminal;
    a control panel configured to receive information from a user; and
    a controller configured to:
        receive, via the control panel, an input for a remote control mode,
        in response to receiving the input for the remote control mode, transmit, to the terminal, a request for a remote control available time, which is a time that the terminal can remote control the cooking appliance, receive, via at least one of the transceiver from the terminal and the control panel, the remote control available time for communicating with the terminal, and control the communication with the terminal based on the received remote control available time, wherein the remote control available time is set by the user, and wherein the information on the remote control available time includes information on an additional time during which remote control is available from a time point at which cooking of food is finished.

2. The cooking appliance of claim 1, wherein the controller is further configured to, when time extension information on a time extension is received within the remote control available time, change the remote control available time based on the received time extension information.

3. The cooking appliance of claim 1, wherein the information on the remote control available time includes at least one piece of information from among a date, time, minutes, and seconds set by the user.

4. The cooking appliance of claim 1, wherein the controller is further configured to, when a total performance time of the remote control mode using the terminal exceeds a preset maximum time limit, block communication with the terminal.

5. The cooking appliance of claim 1, further comprising at least one heating plate, wherein the controller is further is configured to control transmission of operational state information of the at least one heating plate to the terminal.

6. The cooking appliance of claim 1, further comprising:
a cooking compartment in which food is stored; and
an image sensor configured to monitor a cooking state of the food in the cooking compartment,
wherein the controller is further configured to transmit monitored information to the terminal based on the information of the remote control available time.

7. The cooking appliance of claim 6, further comprising:
a door configured to open and close the cooking compartment; and
a detector configured to detect an open state or a closed state of the door,
wherein the controller is further configured to, when the door is in the open state within the remote control available time, block communication with the terminal.

8. The cooking appliance of claim 6, wherein the controller is further configured to, when a control command is received from the terminal within the remote control available time, control cooking of the food based on the received control command.

9. The cooking appliance of claim 6, wherein the controller is further configured to:
when the terminal is set as a master terminal, receive a control command therefrom and control operation of at least one of a plurality of loads and control transmission of monitored information, and
when the terminal is set as a slave terminal, control transmission of monitoring information.

* * * * *